(12) United States Patent
Joo et al.

(10) Patent No.: US 7,181,101 B2
(45) Date of Patent: Feb. 20, 2007

(54) OPTICAL MEASURING SYSTEM WITH ARRAYED OPTICAL RECEIVERS AND METHOD THEREOF

(75) Inventors: Gwan Chong Joo, Hwasung (KR); Jae Shik Choi, Hwasung (KR); Ki Woo Chung, Hwasung (KR); Do Hoon Kim, Hwasung (KR)

(73) Assignees: Hantech Co., Ltd., Kyungki-do (KR); Institute of Information Technology Assessment, Daejeon (KR)

( * ) Notice: Subject to any disclaimer, the term of this patent is extended or adjusted under 35 U.S.C. 154(b) by 26 days.

(21) Appl. No.: 10/515,460

(22) PCT Filed: Jul. 12, 2002

(86) PCT No.: PCT/KR02/01320

§ 371 (c)(1),
(2), (4) Date: Nov. 22, 2004

(87) PCT Pub. No.: WO03/104757

PCT Pub. Date: Dec. 18, 2003

(65) Prior Publication Data

US 2005/0163507 A1 Jul. 28, 2005

(30) Foreign Application Priority Data

Jun. 5, 2002 (KR) ................ 2002-31637

(51) Int. Cl.
*G02B 6/26* (2006.01)
*G02B 6/36* (2006.01)
*H04B 10/08* (2006.01)

(52) U.S. Cl. ............ 385/16; 385/15; 385/24; 385/147; 398/34

(58) Field of Classification Search ............ 385/16
See application file for complete search history.

(56) References Cited

U.S. PATENT DOCUMENTS 6,753,958 B2 * 6/2004 Berolo et al. ............ 356/328

FOREIGN PATENT DOCUMENTS

| EP | 1 063 503 A | 12/2000 |
|----|----|----|
| EP | 1 063 503 B | 10/2004 |
| JP | 04-048228 | 2/1992 |
| JP | 06-202012 | 7/1994 |
| JP | 07-294380 | 11/1995 |
| JP | 11-153723 | 6/1999 |

* cited by examiner

*Primary Examiner*—Michelle Connelly-Cushwa
(74) *Attorney, Agent, or Firm*—Frommer Lawrence & Haug LLP; Ronald R. Santucci

(57) ABSTRACT

The disclosure is an optical measuring system and the method thereof for precisely measuring physical characteristics of light emitted from waveguides, such as beam size, pattern, strength, focusing, collimation degree, and divergence angle, by means of a plane optical detector in which a plurality of pixels formed by a semiconductor fabrication process are arranged in an array, without specific measuring means. The light is incident into ends of the arrayed waveguides with uniform time intervals and emitted from the other ends of the waveguides to reach the optical detectors through which the physical characteristics of the light are obtained and defined arithmetically.

21 Claims, 5 Drawing Sheets

OPTICAL MEASURING SYSTEM WITH ARRAYED OPTICAL RECEIVERS AND METHOD THEREOF

This application is a 371 of PCT/KR02/01320 filed on Jul. 12, 2002, published on Dec. 18, 2003 under publication number WO 03/104757 A1 which claims priority benefits from Korean patent application number KR 2002-31637 filed Jun. 5, 2002.

BACKGROUND OF THE INVENTION

1. Field of the Invention

The invention generally relates to optical communications with wavelength division-multiplexing, and more particularly, to an optical measuring system and the method for obtaining physical characteristics of light flux emitted from a waveguide array.

2. Description of the Related Art

The wavelength division multiplexing (WDM), as a newly advanced communication technique, transfers an optical signal budget in which various informational contained in light spectrums of plural wavelengths, enhancing a transmission speed (or a data rate) in proportion to the applicable number of wavelengths. Such a WDM needs a multi-channel arrayed light source capable of signalizing information data with light of different wavelengths.

There have been used several kinds of parallel (or arrayed) waveguides, such as variable optical attenuators and optical fiber arrays. The waveguide array is formed of plural waveguides spaced with the same intervals from each other and designed to emit uniform pattern and characteristics of light flux (or beam) from each waveguide. However, it may vary substantially beam patterns and intervals because of manufacturing errors and so on, which downs product yields as well as deteriorating efficiencies of optical coupling and characteristics of optical signals in fabricating arrayed optical device modules with quite precise operations. Therefore, it is important for an improvement of module fabrication process and a management of product quality to accurately measure characteristics of beam emitted from the waveguide array.

Usually is a typical device for measuring the parallel beams to survey beam intervals, uniformities, quantities, and so on, moving each stage on the two-dimensional plane of X and Y axes, when the beams are emitted from waveguides with the maximum power rate after receiving beams through the waveguides, which are arranged with uniform intervals, from a light source. But, it would also result in variations of measurement influenced from accuracy of stages as well as aberrations of lenses accepting the beams from the waveguides.

Even recent high-resolution stages with the order of nanometers are incapable of extending their movement ranges over several hundreds micrometers. On the other hand, enlarging the movement range of the stage inevitably causes the resolution to be lower, accompanying with additional apparatuses such as laser interferometers. A measurement system employing a laser interferometer or a high-resolution stage is less available because it is very expensive and needs environmental cleanness over a predetermined level, further with disadvantages of large bulk and definite endurance.

SUMMARY OF THE INVENTION

It is, therefore, an object of the present invention to provide an optical measurement system and the method thereof capable of obtaining accurate results for beam patterns and uniformity emitted from a waveguide array.

It is another object of the present invention to provide an optical measurement system and the method thereof capable of obtaining accurate results for beam patterns and uniformity emitted from a waveguide array, without additional devices such as laser interferometers.

In order to attain the above objects, according to an aspect of the present invention, there is provided an optical measurement system comprising: a waveguide array including a multiplicity of waveguides arranged in parallel with a uniform interval; an optical switch for selectively transmitting beams into the waveguides in series; an optical receiver for receiving the beam emitted from a selected one of the waveguides; and a processing unit for operating an arithmetic process with data supplied from the optical receiver.

The processing unit comprises: a controller for interfacing the data of the optical receiver; and a digital signal processor for calculating characteristic data involved in the beam from the data of the optical receiver. The optical switch selects an alternative one of the waveguides in response to a selection signal generated from the controller.

A first mover shifts the optical receiver along a traveling direction of the beam by a predetermined distance in response to a first control signal generated from the controller.

The digital signal processor obtains a divergence angle from results measures before and after shifting the optical receiver by the first mover.

A second mover shifts the optical receiver in parallel with the waveguide array by a predetermined distance in response to a second control signal generated from the controller, the second control signal being active after a presence of measured results involved in a part of the waveguides when a beam deviates a luminous domain of the optical receiver.

The predetermined distance by the second mover is designed to settle the optical receiver on a position at which the optical receiver luminously responds to at least one of the part of the waveguides and another part of the waveguides. The predetermined distance by the second mover is designed to settle the optical receiver on a position at which the optical receiver luminously responds to at least two-waveguides respectively included in different groups of the waveguides.

The digital signal processor corrects the characteristic data by means of a difference between data values involved in the waveguides respectively included in the groups before and after the shift of the optical receiver.

A method of measuring characteristics of beams emitted from a waveguide array formed of a multiplicity of waveguides arranged in parallel each other with a uniform interval comprises: a first step for selecting an alternative one of the waveguides; a second step for transmitting the beam into an optical receiver through the selected waveguide; a third step for obtaining a characteristic data from outputs of the optical receiver positioned at a first point, the optical receiver; and a fourth step for repeating the first through third steps until completing measurement for all the waveguides.

The third step obtains the characteristic data including a beam size, a focus, and strength from the outputs of the optical receiver positioned at the first point. Third step receives the outputs of the optical receiver positioned at the first point for a number of times and obtains the characteristic data including a beam size, a focus, and strength from the mean value of the outputs of the optical receiver positioned at the first point.

The third step comprises the steps of: shifting the optical receiver to a second point apart from the first point along a traveling direction of the beam with a predetermined distance; and obtaining characteristic data including a beam size, a focus, and strength from the mean value of outputs of the optical receiver positioned at the second point. The third step also comprises the step of obtaining the characteristic data including a divergence angle and a focus from the outputs of the optical receiver positioned at the first and points respectively.

The third step receives the outputs of the optical receiver positioned at the second point for a number of times and obtains the characteristic data including a beam size, a focus, and strength from the outputs of the optical receiver positioned at the second point.

The fourth step comprises the steps of: discriminating the beam is luminously settled on a receiving domain of the optical receiver; repeating the first though third steps for a group of the waveguides when the beam deviates the receiving domain of the optical receiver; shifting the optical receiver in parallel with the waveguide array by a predetermined distance; and repeating the first through third steps for the other group of the waveguides.

The present invention will be better understood from the following detailed description of the exemplary embodiment thereof taken in conjunction with the accompanying drawings, and its scope will be pointed out in the appended claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

It should be understood that the description of the preferred embodiment is merely illustrative and that it should not be taken in a limiting sense. In the following detailed description, several specific details are set forth in order to provide a thorough understanding of the present invention.

It will be obvious, however, to one skilled in the art that the present invention may be practiced without these specific details.

Now, practical embodiments of the invention will be explained in conjunction with the drawings.

Figure 1:
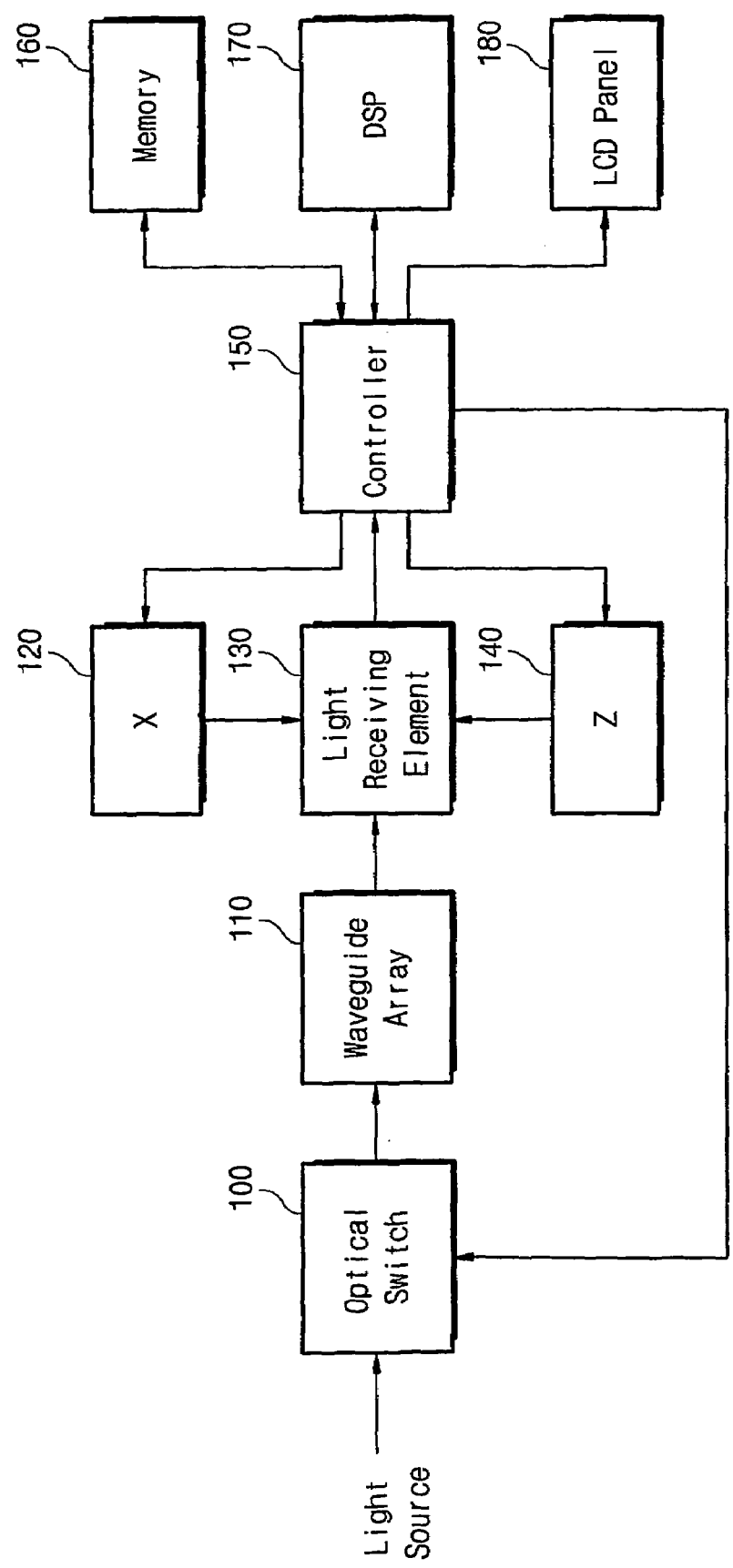
FIG. 1 is a functional schematic of a optical measuring system according to an embodiment of the invention.

Referring to FIG. 1, the optical measurement system includes an optical switch 100, a waveguide array 110, an X-axis mover 120, an optical receiver 130, a Z-axis mover 140, a controller 150, a memory 160, a digital signal processor (DSP) 170, and a liquid crystal display (LCD) panel 180.

The optical switch 100 introduces a beam from a light source into a selected one of waveguides in response to the controller 150. There are various ways to apply beams into the waveguides sequentially. For instance, one way is to let the light sources serially radiate with predetermined time interval after connecting the light sources to inlets of the waveguides. Another way is to sequentially receive beams from a light source through a 1×N optical switching device interposed between the light source and a waveguide. Or, it is also applicable, after once introducing one light source into one waveguide, to shift the light source by a predetermined distance in parallel with the direction of waveguide arrangement so as to apply the light source into the next waveguide. The other ways to apply the light source into the waveguides may be operable in various types by those skilled in this art, not defined to the aforementioned.

Figure 2:
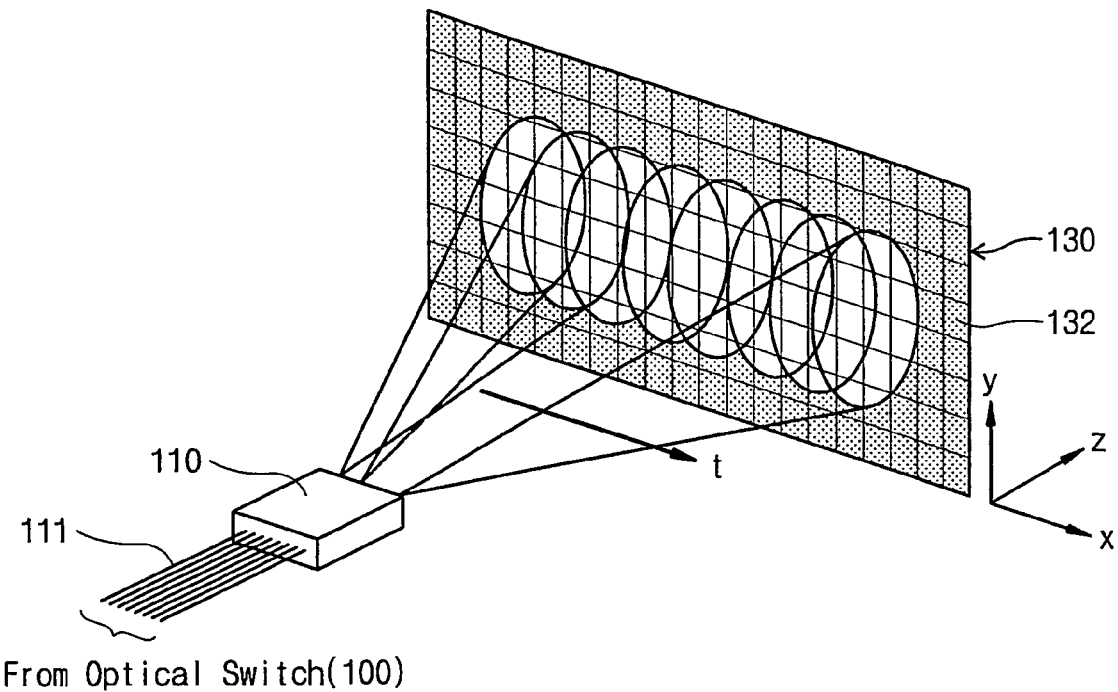
FIG. 2 is a schematic illustrating an arrangement for measuring patterns of parallel light flux according to the invention.

The waveguide array 110, referring to FIG. 2, is composed of a multiplicity of waveguides 111 arranged in parallel with a uniform interval, e.g., 250 nm or 127 nm. FIG. 2 shows the feature that the beams from the light source illuminate pixels 132 arranged on the optical receiver 130 after passing through the optical switch 100 and the waveguide array 100.

The optical receiver 130 is composed of a multiplicity of the pixels 132 arranged in a matrix type, as shown in FIG. 2. It is desirable to make a receiving area on the optical receiver 130 be wider as possible to enhance accuracy of beam analysis through more pixels being illuminated by the incident beam. Since the optical beam emitted to the air from a waveguide spreads out with a uniform angle therein, it is advantageous for increasing the number of the illuminable pixels to locate the optical receiver 130 at a loner distance from the waveguide array 120 as possible within an overall receiving area of the optical receiver 130.

In the meantime, a simultaneous emission of beam from waveguides of the array 110 may result in hard conditions of analyzing characteristics for an individual beam because of different light quantities at the pixels of the optical receiver 130 due to overlapped portions between receiving areas of adjacent waveguides. For the purpose of eliminating such a problem, the optical switch 100 controls the waveguides of the array 110 to emit the beams sequentially with a uniform time interval that is longer than a response time of the optical receiver, applying one beam to one pixel each by each during a predetermined time for measurement.

The controller 130 receives photosensitive information of each pixel 132 on the optical receiver 130. The DSP 170 receives the photosensitive information from the pixels 132 of the optical receiver 130 through the controller 150 and then calibrates luminous size, focusing, strength, divergence angle, and collimation degree. The DSP 170 provides the measured results thereof to the controller 150.

The controller 150 stores the measured data of the DSP 170 in the memory 160 and applies them to the LCD panel 180 for display. The controller 150 also generates control signals to adjust the X- and Z-axes movers, 120 and 140.

The X-axis mover 120, as shown in FIG. 2, transfers the optical receiver 130 to the direction of X-axis (horizontally) in parallel with the waveguide array 100, while the Z-axis mover 140 does the optical receiver 130 to the traveling direction of the beam, i.e., Z-axis (horizontally but rectangular to the X-axis). It will be detailed later about the X- and Z-axes movers, 120 and 140.

Figure 5A:
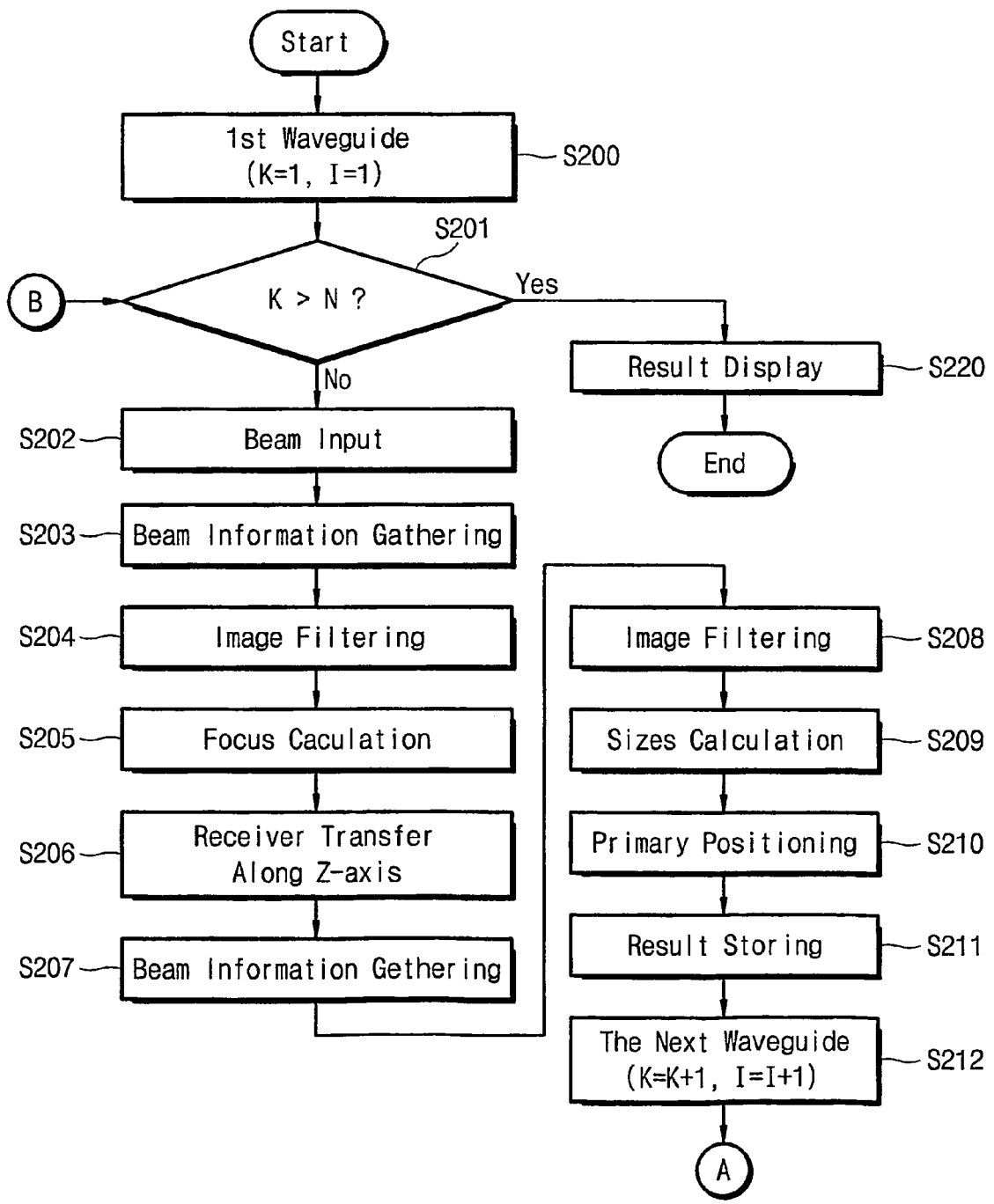
FIGS. 5A and 5B are flow charts for operating an optical measuring procedure according to an embodiment of the invention.
Figure 5B:
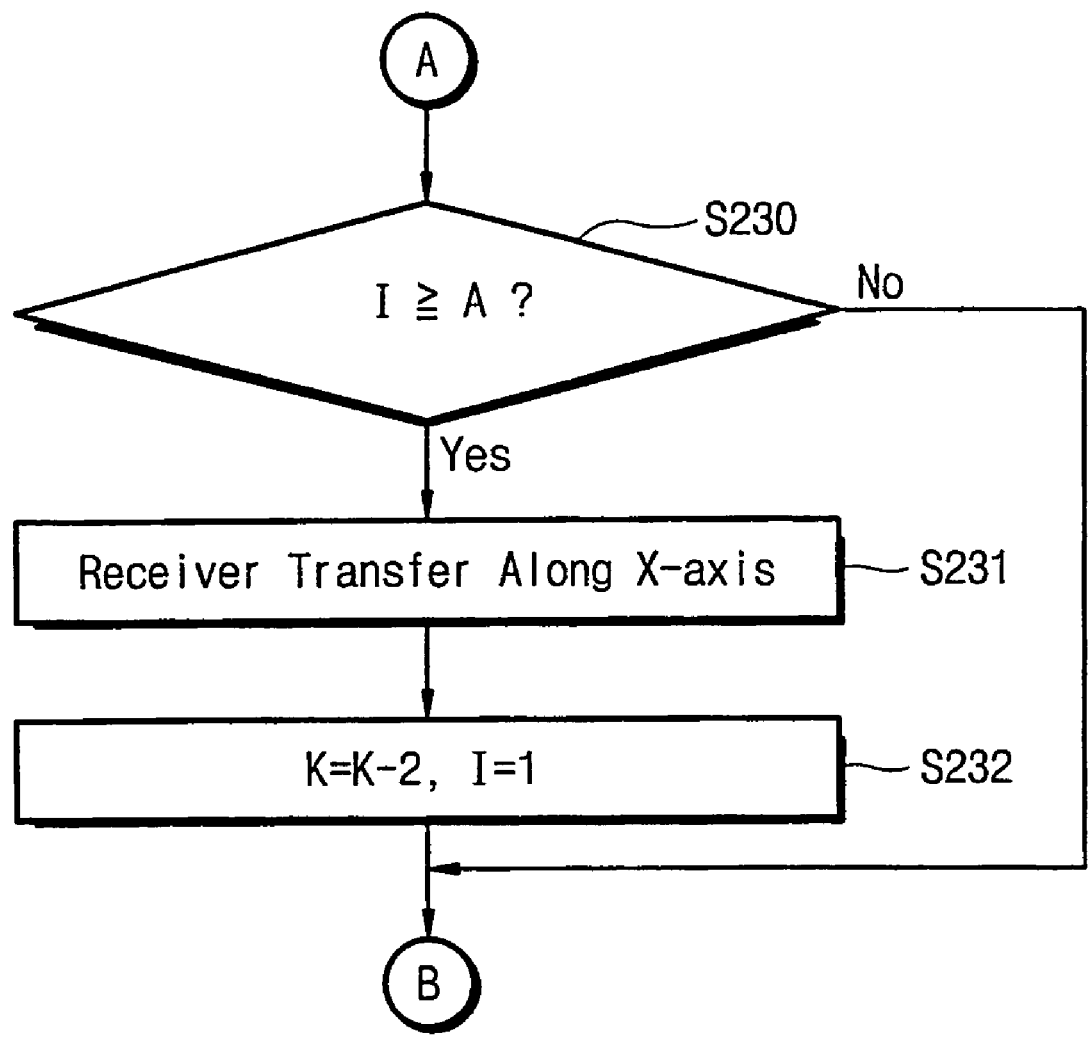

Now refers to FIGS. 5A and 5B showing an operational procedure in the present system of FIG. 1 or 2. In the flow charts of FIGS. 5A and 5B, symbolic characters N, K, and I denote the number of the waveguides arranged in the array 110, e.g., N=8, an index of a waveguide, among the N waveguides, selected by the optical switch 100, and an index used for transferring the optical receiver 130 in accordance with a relative condition between a beam size of the array 110 and a receiving area on the optical receiver 130, respectively.

First, in a step S200, the controller 150 selects a first one of the waveguide array 110 and sets values of internal counters, K and I, on "1". In a step S201, the controller 150 checks out whether or not the count value K is larger than the number of all waveguides, N. As the current count value K is "1" that is smaller than N (i.e., 8), it goes to a step S202.

In the step S202, the controller 150 operates the optical switch 100 to transmit a beam into the selected waveguide of the array 110. As the optical switch 130 assigned to the selected waveguide is turned on, a beam emitted from the selected waveguide is illuminated on a predetermined pixel region of the optical receiver 130.

Next, during a step S203, the controller 150 iteratively receives photosensitive data from the optical receiver 130 in predetermined times and then obtains beam information data (or image data) from the mean value of the stacked photosensitive data provided from the pixels 132 of the optical receiver 130.

In a step S204, the controller 150 applies the image data obtained from the optical receiver 130 to the DSP 170. The DSP 170 conducts an image filtering process for the image data. During a step S205, the DSP 170 operates an arithmetic process for the filtered image data to obtain data of focusing, strength, size, and pattern, of the beam.

In a step S206, the controller 150 operates the Z-axis mover 140 to transfer the optical receiver 130 in order to measure beam divergence angles emitted from the waveguide array 110 and collimation degrees between the beams.

Figure 3:
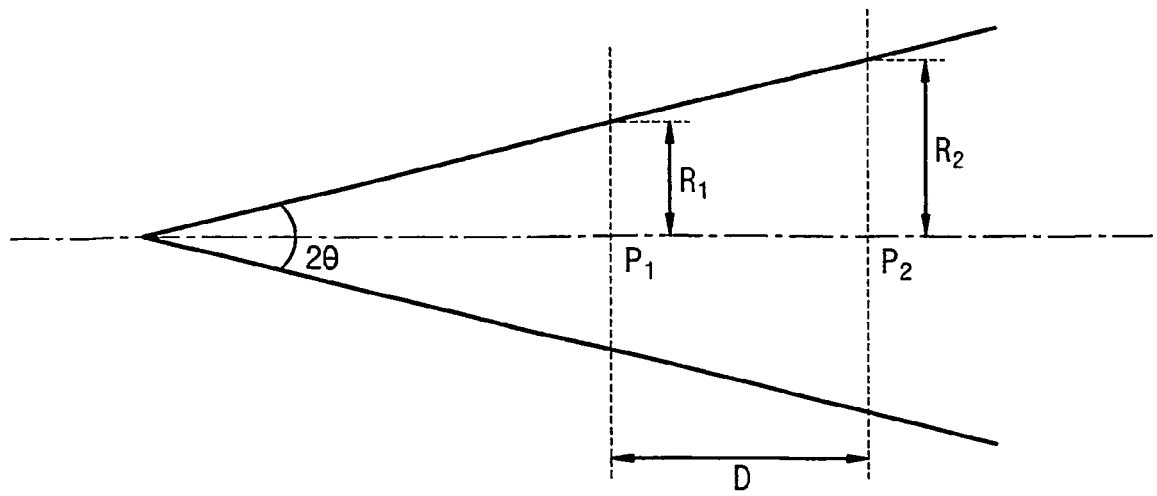
FIG. 3 illustrates a methodological schematic for calculating an divergence angle of light flux output from a waveguide array by migrating plane-type optical device.

Referring to FIG. 3 showing methodology for calculating the beam divergence angle, the DSP 170 obtains a radius R1 of the beam from the image data, accepted from the optical receiver 130, at a first point P1 apart from the waveguide array 110 by a predetermined distance during the steps S203 and S204, and then further computes another radius R2 of the beam at a second point P2, apart from the first point P1 by a predetermined distance D, to which the optical receiver 130 has been transferred by the Z-axis mover 140 in parallel with the traveling direction of the beam, during steps S207 and S209. Thereby, the beam divergence angle is obtained by the following equation:

$$\theta = \tan^{-1}[(R^2 - R^1)/D] \qquad \text{Equation 1}$$

The way to calculate the collimation degrees between the beams emitted from the waveguides is similar to the aforementioned procedure. That is, the focuses of the beams emitted from the waveguides in number of N are first found from the image data supplied from the optical receiver 130 when the optical receiver 130 is positioned at the first point P1, and secondly found when the optical receiver 130 is positioned at the second point P2 that is more apart from the waveguide array 110 than the first point P1. After then, the DSP 170 computes distances ($D_1K$; k=1~N~1) between the beam focuses at the first point P1 and distances ($D_2k$) between the beam focuses at the second point P2. The values of the inter-focus distances ($D_1K$ and $D_2k$) each found at the points P1 and P2 are put into an arithmetic process for obtaining the collimation degree between the beams, by means of a simple equation with differences between the distances ($D_11-D_2K$). The DSP 170 outputs the arithmetic results, about the beam characteristics of the size, the pattern, the strength, the divergence angle, and the collimation degree, to the controller 150.

Next, in a step S210, after receiving the arithmetic results, the controller 150 operates the Z-axis mover 140 to return the optical receiver 130 to the first point P1 the primary position of the optical receiver 130. In a step S211, the arithmetic results are stored in the memory 160 as binary data. During a step S212, the controller 150 increases the count values K and I by "1" in order to select the next waveguide.

On the other hand, it needs a specific process therein when a beam radiated from the waveguide array 110 deviates the domain of the receiving are. For instance, assuming that 8 is the number of waveguides corresponding to the number of receptible beams, A, among the N of 16, the procedure for measuring the characteristics of the beams emitted from the 16 waveguides is as follows.

Figure 4:
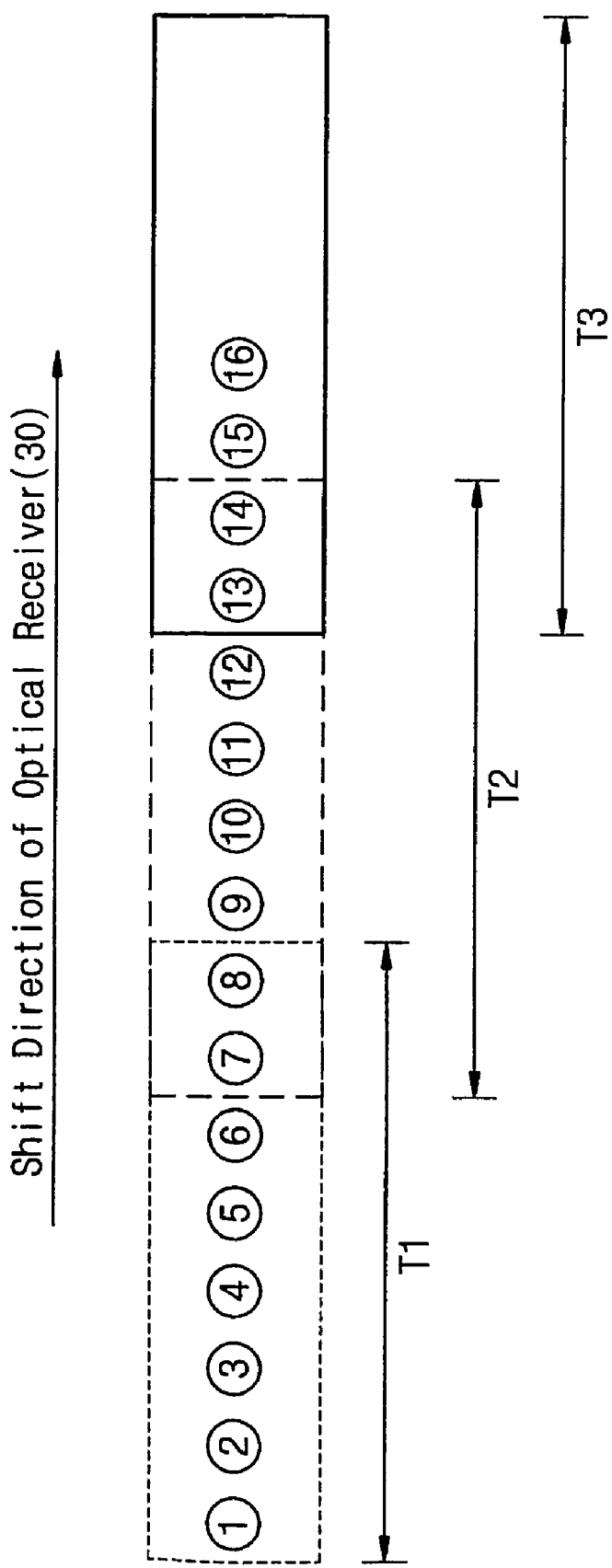
FIG. 4 is illustrates migration course and distance of the optical device when the light flux emitted from the waveguide strays from the domain of the optical device.

It refers to FIG. 4 schematizing transfer direction and distance of the optical receiver 130, together with FIG. 5B associatively cooperating with the flow of FIG. 5A, when the beam deviates the domain of the optical receiver 130.

In a step S230 of FIG. 5B, the controller 150 checks whether or not the count value I (I=1~N) is larger than the predetermined value of A, i.e., 8. If I is not more than 8, it turns to the step S201 while proceeds a step S231 if I is larger than 8.

During the step S231, the X-axis mover 120 shifts the optical receiver 130 in parallel with the arrangement direction of the waveguides by eight pitches of the waveguides. As a result, the optical receiver 130 can accept the beams emitted from all the waveguides 111 of the array 110. While this, it is desirable to proceed the measuring processes for a part of the 1'st through 8'th waveguides together with the 9'th through 16'th waveguides in order to merge information about beam positions of the 1'st through 8'th and the 9'th through 16'th waveguides, preventing discontinuity of the beam position information throughout the waveguides. For example, after shifting the optical receiver 130, which has faced to the 1'st through eighth waveguides in parallel, by six (8−2=6) pitches, the optical receiver 130 becomes opposite in parallel with the 7'th through 14'th waveguides.

Next, the index K of the internal counter decreases by "2", and the count value I of another counter is set on "1". Thus, the index K is settled on a value of "7" (9−2). In the former example, as shown in FIG. 4, if the entire number of the waveguides disposed in the array 110 is 16, beam characteristics involved in the 1'st through 8'th waveguides are obtained during a first measuring period T1, those of the 7'th through 14'th waveguides during a second measuring period T2, and those of the 13'th and 16'th waveguides during a third measuring period T3, being overlapped between the period partially.

As seen from FIG. 4, the beams emitted from the 7'th and 8'th waveguides are put to participate in the measuring process during both the periods T1 and T2, iteratively both before and after the transfer of the optical receiver 130.

Therefore, it is available for the DSP 170 to correct characteristic data, maybe defective, by means of a difference between data values resulting from the measurements for the beams of the 7'th and 8'th waveguides during both the first period T1 and the second period T2, i.e., respectively both before and after the shift of the optical receiver 130.

As same, the iterative measuring process, during both the periods T2 and T3, for the beams emitted from the 13'th and 14'th waveguides both before and after the transfer of the optical receiver 130, contributes to data correction between data values resulting from the measurements for the beams of the 13'th and 14'th waveguides during both the second period T2 and the third period T3, i.e., respectively both before and after the shift of the optical receiver 130.

After completing the steps, it returns to the step S201. If K is not less than N at the step S201, the controller 150 applies the resultant data to the LCD panel 180 for displaying and the measurement process terminates.

According to the pre-description, the present system for measurement system obtains various characteristics of beams emitted from an waveguide array, such as beam size, pattern, strength, focus, collimation degree, and divergence angle, without additional devices such as laser interferometers or high-resolution optical devices. As variations of performances of components employed in the system excluded from influences against the resultant data of measurement, it is possible to accurately detect physical characteristics of beams emitted from the waveguide array.

Although the preferred embodiments of the present invention have been disclosed for illustrative purposes, those skilled in the art will appreciate that various modifications, additions and substitutions are possible, without departing from the scope and spirit of the invention as described in the accompanying claims

What is claimed is:

1. An optical measurement system comprising:
    a waveguide array including a multiplicity of waveguides arranged in parallel with a uniform interval;
    an optical switch for selectively transmitting beams into the waveguides in series;
    an optical receiver for receiving the beam emitted from a selected one of the waveguides, the optical receiver being composed of a plurality of pixels arranged in a matrix and common to each of the plurality of waveguides; and
    a processing unit for operating an arithmetic process with data supplied from the optical receiver.

2. The system of claim 1, wherein the processing unit comprises:
    a controller for interfacing the data of the optical receiver; and
    a digital signal processor for calculating characteristic data, which include at least one of a beam size, a focus, and a strength, involved in the beam from the data of the optical receiver.

3. The system of claim 2, wherein the optical switch selects an alternative one of the waveguides in response to a selection signal generated from the controller.

4. The system of claim 2, wherein the processing unit further comprises a first mover for shifting the optical receiver along a traveling direction of the beam by a predetermined distance in response to a first control signal generated from the controller.

5. The system of claim 4, wherein the digital signal processor obtains a divergence angle from results measured before and after shifting the optical receiver by the first mover.

6. The system of claim 5, wherein the processor unit further comprises a second mover for shifting the optical receiver in parallel with the waveguide array by a predetermined distance in response to a second control signal generated from the controller, the second control signal being active after a presence of measured results involved in a part of the waveguides when a beam deviates a luminous domain of the optical receiver.

7. The system of claim 6, wherein the predetermined distance by the second mover is designed to settle the optical receiver on a position at which the optical receiver luminously responds to at least one of the part of the waveguides and another part of the waveguides.

8. The system of claim 7, wherein the digital signal processor corrects the characteristic data by means of a difference between data values involved in the waveguides respectively included in the groups before and after the shift of the optical receiver.

9. The system of claim 6, wherein the predetermined distance by the second mover is designed to settle the optical receiver on a position at which the optical receiver luminously responds to at least two waveguides respectively included in different groups of the waveguides.

10. The system of claim 9, wherein the digital signal processor corrects the characteristic data by means of a difference between data values involved in the waveguides respectively included in the groups before and after the shift of the optical receiver.

11. A method of measuring characteristics of beams emitted from a waveguide array formed of a multiplicity of waveguides arranged in parallel with each other with a uniform interval, the method comprising:
    a first step for selecting an alternative one of the waveguides;
    a second step for transmitting the beam into an optical receiver through the selected waveguide, the optical receiver being composed of a plurality of pixels arranged in a matrix and common to each of the plurality of waveguides;
    a third step for obtaining a characteristic data from outputs of the optical receiver positioned at a first point, the optical receiver; and
    a fourth step for repeating the first through third steps until completing measurement for all the waveguides.

12. The method of claim 11, wherein the third step obtains the characteristic data including a beam size, a focus, and strength from the outputs of the optical receiver positioned at the first point.

13. The method of claim 12, wherein the third step receives the outputs of the optical receiver positioned at the first point for a number of times and obtains the characteristic data including a beam size, a focus, and strength from the mean value of the outputs of the optical receiver positioned at the first point.

14. The method of claim 11, wherein the third step comprises the steps of:
    shifting the optical receiver to a second point apart from the first point along a traveling direction of the beam with a predetermined distance; and
    obtaining characteristic data including a beam size, a focus, and strength from the mean value of outputs of the optical receiver positioned at the second point.

15. The method of claim 14, wherein the third step further comprises the step of obtaining the characteristic data including a divergence angle and a focus from the outputs of the optical receiver positioned at the first and points respectively.

16. The method of claim 14, wherein the third step receives the outputs of the optical receiver positioned at the second point for a number of times and obtains the characteristic data including a beam size, a focus, and strength from the outputs of the optical receiver positioned at the second point.

17. The method of claim 11, wherein the fourth step comprises the steps of:
   discriminating the beam is luminously settled on a receiving domain of the optical receiver;
   repeating the first through third steps for a group of the waveguides when the beam deviates the receiving domain of the optical receiver;
   shifting the optical receiver in parallel with the waveguide array by a predetermined distance; and
   repeating the first through third steps for the other group of the waveguides.

18. The method of claim 17, wherein the predetermined distance is designed to settle the optical receiver on a position at which the optical receiver luminously responds to at least one of the group of the waveguides and the other group of the waveguides.

19. The method of claim 18, wherein the fourth step further comprises the step of correcting the characteristic data by means of a difference between data values involved in the waveguides respectively included in the groups before and after the shift of the optical receiver.

20. The method of claim 17, wherein the predetermined distance is designed to settle the optical receiver on a position at which the optical receiver luminously responds to at least two waveguides respectively differently included in the groups of the waveguides.

21. The method of claim 20, wherein the fourth step further comprises the step of correcting the characteristic data by means of a difference between data values involved in the waveguides respectively included in the groups before and after the shift of the optical receiver.

* * * * *